United States Patent
Jamison et al.

(10) Patent No.: US 10,753,164 B1
(45) Date of Patent: Aug. 25, 2020

(54) GRAPHENE OXIDE COATED MEMBRANES TO INCREASE THE DENSITY OF WATER BASE FLUIDS

(71) Applicant: Halliburton Energy Services, Inc., Houston, TX (US)

(72) Inventors: Dale E. Jamison, Humble, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/599,308

(22) Filed: Oct. 11, 2019

(51) Int. Cl.
  E21B 21/06 (2006.01)
  C09K 8/92 (2006.01)
  C09K 8/03 (2006.01)
  B01D 17/04 (2006.01)
  C09K 8/035 (2006.01)

(52) U.S. Cl.
  CPC .......... *E21B 21/063* (2013.01); *B01D 17/045* (2013.01); *C09K 8/032* (2013.01); *C09K 8/035* (2013.01); *C09K 8/92* (2013.01); *E21B 21/062* (2013.01)

(58) Field of Classification Search
  None
  See application file for complete search history.

(56) References Cited

U.S. PATENT DOCUMENTS

| | | | |
|---|---|---|---|
| 2,218,533 A | * | 10/1940 | Huebotter ............. E21B 21/065 175/66 |
| 3,533,480 A | * | 10/1970 | Chenevert ................ C09K 8/36 175/66 |
| 4,872,991 A | | 10/1989 | Bartels et al. |
| 5,129,468 A | | 7/1992 | Parmenter |
| 5,258,123 A | * | 11/1993 | Huang ................... B01D 15/00 210/663 |

(Continued)

FOREIGN PATENT DOCUMENTS

| JP | 2017159291 A | 9/2017 |
|---|---|---|
| KR | 101837230 B1 | 3/2018 |

(Continued)

OTHER PUBLICATIONS

Graphene for Water Treatment; Investorintel; 2017; pp. 1-3; https://investorintel.com/sectors/cleantech/cleantech-intel/graphene-water-treatment/ (Year: 2017).*

Acknowledgement receipt and specification for foreign application entitled "Graphene Oxide Coated Membranes to Increase the Density of Water Base Fluids," by Dale E. Jamison, et al., filed Oct. 15, 2019 as International application No. PCT/US2019/056308.

(Continued)

*Primary Examiner* — Anuradha Ahuja
(74) *Attorney, Agent, or Firm* — Conley Rose, P.C.; Rodney B. Carroll

(57) ABSTRACT

A method of servicing a wellbore extending from a surface of the earth and penetrating a subterranean formation, including: removing water from an aqueous based wellbore servicing fluid by contacting the aqueous based wellbore servicing fluid with a porous substrate coated with a hydrophilic and oleophobic coating, whereby water is removed from the aqueous based wellbore servicing fluid via passage through the porous substrate, and whereby a water concentration and a volume of the aqueous based wellbore servicing fluid are reduced and a density of the aqueous based wellbore servicing fluid is increased to provide a modified aqueous based wellbore servicing fluid.

10 Claims, 5 Drawing Sheets

(56) References Cited

U.S. PATENT DOCUMENTS

| | | | |
|---|---|---|---|
| 7,491,336 B2 | 2/2009 | Markham et al. | |
| 7,497,954 B2 | 3/2009 | Ivan et al. | |
| 7,608,186 B2 | 10/2009 | Bansal et al. | |
| 8,097,163 B1* | 1/2012 | Stewart | B01D 61/025 |
| | | | 210/408 |
| 2006/0008865 A1 | 1/2006 | Cote et al. | |
| 2008/0156709 A1 | 7/2008 | Johnson | |
| 2009/0107728 A1* | 4/2009 | Gaddis | E21B 21/062 |
| | | | 175/66 |
| 2010/0204066 A1* | 8/2010 | Ivan | E21B 21/068 |
| | | | 507/103 |
| 2013/0146536 A1 | 6/2013 | Tarabara et al. | |
| 2013/0270188 A1* | 10/2013 | Karnik | B01D 53/228 |
| | | | 210/650 |
| 2015/0136712 A1 | 5/2015 | Carr et al. | |
| 2016/0263494 A1 | 9/2016 | Mueller et al. | |
| 2017/0232402 A1 | 8/2017 | Xiao et al. | |
| 2018/0155602 A1 | 6/2018 | Zhang et al. | |
| 2018/0230024 A1 | 8/2018 | Glynn | |
| 2018/0250704 A1 | 9/2018 | Truica-Marasescu et al. | |
| 2018/0333654 A1 | 11/2018 | Hugonin | |
| 2019/0001277 A1 | 1/2019 | Wolff | |

FOREIGN PATENT DOCUMENTS

| | | |
|---|---|---|
| RU | 2012125859 A | 1/2014 |
| WO | 8500532 A1 | 2/1985 |
| WO | 2012158522 A2 | 11/2012 |
| WO | 2018185746 A1 | 10/2018 |

OTHER PUBLICATIONS

Filing receipt and specification for patent application entitled "Coated Porous Substrates for Oil and Gas or Chemical Processing Wastewater Treatment," by Dale E. Jamison, et al., filed Oct. 11, 2019 as U.S. Appl. No. 16/599,314.

Acknowledgement receipt and specification for foreign application entitled "Coated Porous Substrates for Oil and Gas or Chemical Processing Wastewater Treatment," by Dale E. Jamison, et al., filed Oct. 15, 2019 as International application No. PCT/US2019/056310.

Filing receipt and specification for patent application entitled "Coated Porous Substrates for Fracking Water Treatment," by Dale E. Jamison, et al., filed Oct. 11, 2019 as U.S. Appl. No. 16/599,316.

Acknowledgement receipt and specification for foreign application entitled "Coated Porous Substrates for Fracking Water Treatment," by Dale E. Jamison, et al., filed Oct. 15, 2019 as International application No. PCT/US2019/056311.

Foreign Communication from Related Application—International Search report and Written Opinion of the International Searching Authority, International Application No. PCT/US2019/056310, dated Jul. 9, 2020, 10 pages.

Foreign Communication from Related Application—International Search Report and Written Opinion of the International Searching Authority, International Application No. PCT/US2019/056311, dated Jul. 9, 2020, 11 pages.

Foreign Communication from Related Application—International Search Report and Written Opinion of the International Searching Authority, International Application No. PCT/US2019/056308, dated Jul. 7, 2020, 13 pages.

* cited by examiner

GRAPHENE OXIDE COATED MEMBRANES TO INCREASE THE DENSITY OF WATER BASE FLUIDS

TECHNICAL FIELD

The present disclosure relates generally to systems and methods for servicing a wellbore extending from a surface of the earth and penetrating a subterranean formation; more specifically, the present disclosure relates to systems and methods for servicing a wellbore including recovering water from an aqueous based fluid; still more specifically, this disclosure relates to systems and methods for servicing a wellbore wherein water is recovered from an aqueous based fluid via contacting of the aqueous based fluid with a coated substrate including a porous substrate coated with a hydrophilic and oleophobic coating, whereby water is removed from the aqueous based fluid via passage through the coated substrate, and whereby a water concentration and a volume of the aqueous based fluid are reduced and a density of the aqueous based fluid is increased to provide a modified wellbore servicing fluid.

BACKGROUND

During wellbore servicing (e.g., drilling) operations, aqueous based fluids can have and/or can uptake water such that a water concentration is or becomes undesirably high and/or a density of the aqueous based fluid is or becomes undesirably low. Conventionally, the density of, for example, a drilling fluid is increased via the addition of a weighting agent, such as barite. Such addition of weighting agent typically increases the fluid volume. Over time this process may be deemed undesirable, for example, when storage apparatus for the fluid has a limited volume.

Accordingly, there exists a need for a system and method of recovering water from aqueous based fluids during wellbore servicing operations, whereby a water concentration of the water based fluid can be reduced (e.g., and a density increased and/or a volume decreased) and/or the water concentration (e.g., the density and/or volume) maintained. Desirably, the systems and methods enable recovery of potable water and/or the production of a reduced volume of waste material needing disposal.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
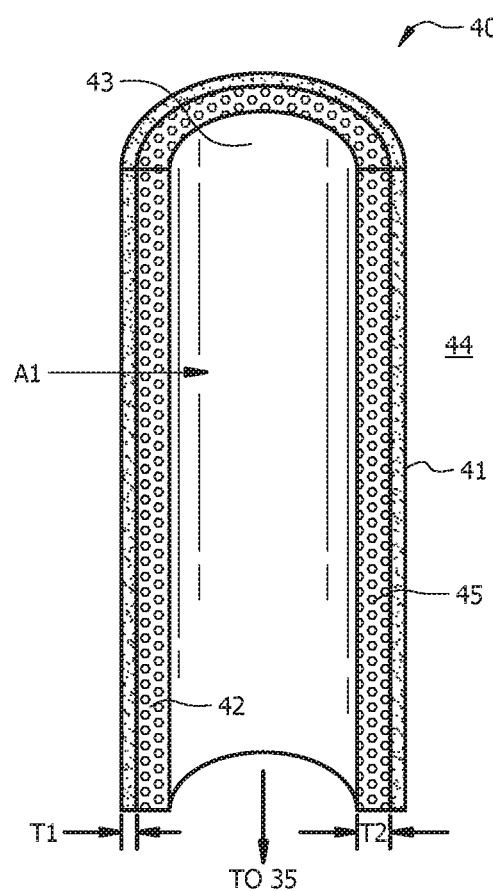
FIG. 1A is a schematic of a coated substrate, according to embodiments of this disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The terms "water based fluids" and "water base fluids" are utilized interchangeably herein, and refer to fluids including a base fluid selected from fresh water, seawater, saturated brine, formate brine, or a combination thereof.

As utilized herein, the term "hydrophilic" indicates "water attracting", i.e., having more thermodynamically favorable interactions with water than with oil or other hydrophobic solvents.

As utilized herein, the term "oleophobic" indicates "oil repelling", i.e., lacking an affinity to oil.

As utilized herein, the term "drilling fluids" includes drill-in fluids, such as brines.

Herein disclosed are systems and methods for servicing a wellbore extending from a surface of the earth and penetrating a subterranean formation. The herein disclosed systems and methods provide for removing water from an aqueous based wellbore servicing fluid by contacting the aqueous based wellbore servicing fluid with a coated substrate including a porous substrate coated with a hydrophilic and oleophobic coating. Via contact of the aqueous based wellbore servicing fluid with the coated porous substrate, water is removed from the aqueous based wellbore servicing fluid via passage through the porous substrate, whereby a water concentration and a volume of the aqueous based wellbore servicing fluid are reduced and a density of the aqueous based wellbore servicing fluid is increased to provide a modified aqueous based wellbore servicing fluid.

In embodiments, the herein disclosed systems and methods can be utilized to improve water base wellbore servicing (e.g., drilling) fluids management. For example, in embodiments, the disclosed systems and methods can be utilized (e.g., at a rig site) to reduce waste and manage drilling fluid density. In embodiments, the herein disclosed wellbore servicing systems and methods can be utilized to manage fluid volumes in a mud plant and potential fluid density and volumes at a rig site and provide for the production of heavier water based fluids with barite additions.

As detailed hereinbelow, coated substrates (e.g., graphene oxide coated membranes) can be utilized to increase the density of water based drilling fluids. Conventionally, increasing the density of a drilling fluid employs the addition of a weighting agent (such as barite), which typically increases the fluid volume. Over time, such a process may be deemed undesirable. Using a coated substrate of this disclosure (e.g., a coated membrane) to remove water from the aqueous based fluid will lower its volume as well as increase the fluid density. In some cases, it may be desirable to remove some water from the aqueous based wellbore servicing fluid to provide a modified aqueous based wellbore servicing fluid and add weighting material to the modified wellbore servicing fluid to maintain a constant fluid volume of the wellbore servicing fluid, while increasing the density thereof.

A method of servicing a wellbore extending from a surface of the earth and penetrating a subterranean formation according to this disclosure includes: removing water from an aqueous based wellbore servicing fluid by contacting the aqueous based wellbore servicing fluid with a coated substrate including a porous substrate coated with a hydrophilic and oleophobic coating. The contacting of the aqueous based wellbore servicing fluid with the coated substrate results in removal of water from the wellbore servicing fluid via passage of water through the porous substrate, whereby a water concentration and a volume of the aqueous based wellbore servicing fluid are reduced and a density of the aqueous based wellbore servicing fluid is increased to provide a modified aqueous based wellbore servicing fluid.

As depicted in FIG. 1A, which is a schematic of a coated substrate 40, according to embodiments of this disclosure, the coated substrate 40 includes a porous substrate 42 including pores 45 and coated by hydrophilic and oleophobic coating 41. The porous substrate can be any suitable substrate which can be coated with the hydrophilic and oleophobic coating and allow passage of water therethrough. In embodiments, the substrate 42 includes a support material. Although referred to as a "porous" substrate 42, a substrate of coated substrate 40 can be any permeable material (e.g., with or without "pores") which can be coated with the hydrophilic and oleophobic coating 41 and allow passage of water therethrough. In embodiments, the porous substrate 42 includes a membrane, a particulate, a tube, or a combination thereof. In the embodiment of FIG. 1A, porous substrate 42 includes a cylindrical tube. In embodiments, porous substrate 42 includes a membrane shaped into a cylindrical tube, a flat membrane, or a membrane in another configuration. In embodiments, the porous substrate includes pores 45 having an average diameter of greater than or equal to about 0.5 nm, 1 nm, 2 nm, 3 nm, 4 nm, 5 nm, 10 nm, 20 nm, 30 nm, 40 nm, or 50 nm, less than or equal to about 20 µm, 10 µm, or 1 µm, or in a range of from about 0.5 nm to about 20,000 nm, from about 5 nm to about 10,000 nm, or from about 50 nm to about 1,000 nm. In embodiments, the porous substrate includes a polymer, a ceramic, a zeolite, a molecular sieve, or a combination thereof.

As depicted in the embodiment of FIG. 1A, the hydrophilic and oleophobic coating of coated substrate 40 can have a thickness T1 in a range of from about 1 to about 100 nm, from about 1 to about 50 nm, or from about 1 to about 50 nm, from about 1 to about 10 nm, less than or equal to about 100, 50, 40, 30, 20, or 10 nm, and/or greater than or equal to about 1, 2, 3, 4, 5, 6, 7, 8, 9, or 10 nm. Also as depicted in the embodiment of FIG. 1A, the porous substrate 42 of coated substrate 40 can have a thickness T2 in a range of from about 0.2 mm to about 100 mm, from about 1 mm to about 50 mm, or from about 10 mm to about 25 mm, less than or equal to about 100 mm, 50 mm, or 25 mm, and/or greater than or equal to about 0.2 mm, 1 mm, or 10 mm.

Figure 1B:
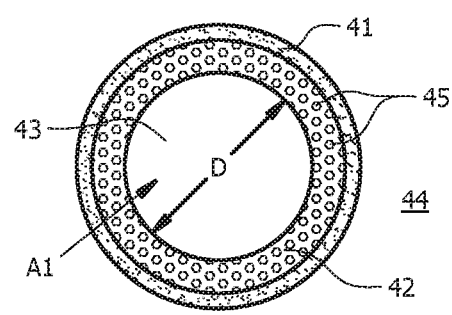
FIG. 1B is a cross section view of the coated substrate of FIG. 1A.

With reference to FIG. 1B, which is a cross section of the coated substrate 40 of FIG. 1A, in embodiments, coated substrate 40 (e.g., a cylindrical or spherical porous substrate 42) has an inner diameter in a range of from about 1 mm to about 50 mm, from about 1 mm to about 25 mm, from about 5 mm to about 35 mm, or from about 10 mm to about 50 mm, less than or equal to about 50 mm, 40 mm, 35 mm, 30 mm, 20 mm, or 10 mm, and/or greater than or equal to about 1 mm, 2 mm, 3 mm, 4 mm, 5 mm, 6 mm, 7 mm, 8 mm, 9 mm, or 10 mm.

Water passes from one side of coated substrate 40 to another, generally from the coated side to the (e.g., porous) substrate side. For example, as depicted in FIG. 1A and FIG. 1B, coated substrate 40 is configured for passage of water from an outside 44 to an inside 43 thereof, as illustrated by arrow A1. Alternatively, a substrate having a cylindrical tube shape is coated on an inside thereof with the hydrophilic and oleophobic coating 41, and water is introduced into the inside 43 of coated substrate 40 and passes from inside 43 to outside 44 (e.g., in a direction opposite that indicated by arrow A1).

As noted hereinabove, the coating 41 of this disclosure is hydrophilic and oleophobic. In embodiments, the hydrophilic and oleophobic coating 41 includes graphene oxide. The natural tendency is for water to migrate through the hydrophilic and oleophobic coated substrate 40 (e.g., a graphene oxide coated membrane) with little or no differential pressure applied to the coated substrate 40 itself. Without limitation, such a graphene coated membrane technology is offered by G2O Water Technologies, Ltd., of Manchester UK. In embodiments, the contacting of the aqueous based fluid with the coated substrate 40 is effected at a differential pressure across the coated substrate 40 of less than or equal to about 10, 9, 8, 7, 6, or 5 psi.

According to this disclosure, the aqueous based wellbore servicing fluid from which water is removed by contact with the coated substrate 40 can include a drilling fluid, a produced water, a drill-in fluid, a packer fluid, a spacer fluid, a cleaner fluid, an acidizing fluid, a filter cake breaking fluid, a fracturing fluid, a lost circulation pill, a recovered brine, or a combination thereof. In embodiments, the aqueous based wellbore servicing fluid is an aqueous based wellbore servicing fluid that has been recovered from a wellbore 60 and/or a formation 64 (described hereinbelow with reference to the embodiment of FIG. 2). Such an aqueous based fluid will be referred to herein as a "spent" aqueous based wellbore servicing fluid. As utilized herein a "spent" aqueous based fluid includes a produced water recovered from a formation 64 and a wellbore servicing (e.g., drilling) fluid that has been recovered from the wellbore 60 (e.g., circulated downward through a drill string 61 extending from the surface 65 into the wellbore 60, out an end 66 of the drill string 61 (e.g., out a drill bit 63 connected to end 66 of the drill string 61), and upward through an annular space 62 formed between the drill string 61 and the wellbore 60). Although shown as pumped via end 66 of drill string 61 and through a drill bit 63 in the embodiment of FIG. 2, in embodiments the wellbore servicing fluid is pumped through a bottom hole assembly (BHA) located at end 66 of drill string 61, and the BHA can include, for example, a by-pass sub, a MWD tool, a mud motor, a logging tool, etc. In such embodiments, component 63 can include such a BHA.

Figure 2:
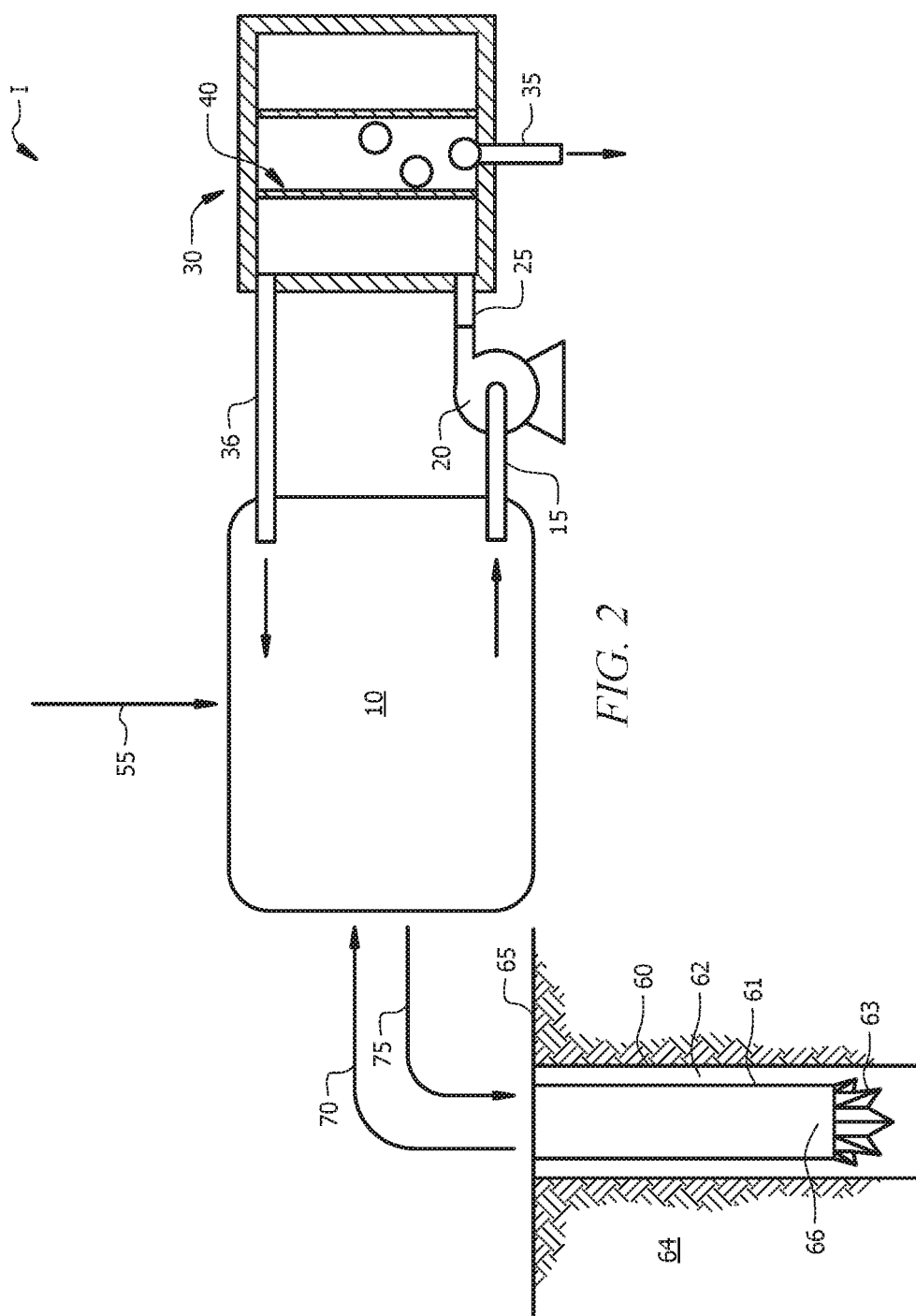
FIG. 2 is a schematic of a system I for recovering water from a water base fluid, according to embodiments of this disclosure.

As depicted in FIG. 2, which is a schematic of a system I for recovering water from a water base drilling fluid, according to embodiments of this disclosure, aqueous based wellbore servicing fluid can be introduced into a water removal or recovery apparatus 30 via a line 25 (which can be a pump outlet line, in embodiments) containing therein the coated substrate 40 (e.g., graphene oxide coated membrane(s)). Pump 20 can be utilized to pump aqueous based wellbore servicing fluid from an aqueous based fluid source, which can be, for example, an aqueous based fluid storage unit 10 into water removal apparatus 30. Pump 20 can be fluidly connected with aqueous based fluid storage unit 10 via pump inlet line 15 and fluidly connected with water removal apparatus 30 via pump outlet line 25. Water removed via passage through the coated substrate 40 can be removed from water removal apparatus 30 via one or more water outlet line(s) 35, and modified aqueous based fluid (e.g., aqueous based fluid from which water has been removed) can be removed from water removal apparatus 30 via one or more modified aqueous based fluid outlet (or "return") line(s) 36.

In embodiments, the water removed from the aqueous based wellbore servicing fluid by the contacting thereof with the coated substrate 40 and passage through the porous substrate 42 coated with the hydrophilic and oleophobic coating 41 is potable water. In embodiments, the water removed from the aqueous based wellbore servicing fluid and from water removal apparatus 30 via water outlet line(s) 35 is potable water having a total dissolved solids (TDS) content of less than or equal to about 5000, 4000, 3000, 2000, 1000, 750, or 500 ppm, a hydrocarbon content of less than or equal to about 500, 400, 300, 200, 100, 90, 80, 70, 60, 50, 40, 30, 20, or 10 mg/L, and/or a salt content of less than or equal to about 5000, 4000, 3000, 2000, 1000, 900, 800, 700, 600, 500, 400, 300, 200, or 100 ppm. In embodiments, the TDS is determined by water evaporation using a precision analytical balance. In embodiments, the TDS is estimated via a TDS meter that estimates the TDS from the electrical conductivity. In embodiments, the hydrocarbon content of the water removed via water outlet line(s) 35 is determined by 40 CFR Part 136 Method 608.3, 624.1, and/or 625.1. In embodiments, the conductivity is determined by measuring the electrical conductivity.

The ability of the herein disclosed system and method to remove potable water from aqueous based wellbore servicing fluids can provide advantages over conventional water removal techniques. For example, the conventional method of filtering to remove water generally allows salts, some degree of hydrocarbons, dissolved solids and the like to pass through the filter along with the removed water. Such filtered water is generally not potable, and can be hazardous, thus presenting challenges for disposal thereof. Via the herein disclosed systems and methods, an amount of hazardous waste material (e.g., hazardous water and/or solid or semi-solid waste) can be reduced relative to conventional systems and methods of removing water from (and thus increasing the density of) aqueous based wellbore servicing fluids. Additionally, conventional filtration generally utilizes higher pressures than the herein disclosed systems and methods to separate water from an aqueous based fluid.

As depicted in the embodiment of FIG. 2, the aqueous based wellbore servicing fluid introduced into water removal apparatus 30 via line 25 can be introduced from an aqueous based fluid storage unit 10 (also referred to as a "water storage unit 10"). In embodiments, water storage unit 10 can include, for example, a mud pit. As noted hereinabove, in embodiment, the aqueous based wellbore servicing fluid from which water is to be removed in water removal apparatus 30 can be an aqueous based wellbore servicing fluid that has been recovered from the wellbore 60 and/or the formation 64 prior to contact with the coated substrate 40 including porous substrate 42 coated with the hydrophilic and oleophobic coating 41. For example, with reference to the embodiment of FIG. 2, in embodiments, an aqueous based wellbore servicing fluid is introduced into aqueous based fluid storage unit 10 via a pathway 70 fluidly connected with wellbore 60 extending from a surface of the earth 65 and penetrating subterranean formation 64. Alternatively, in embodiments, an aqueous based wellbore servicing fluid is introduced directly into water removal apparatus 30 (e.g., without a water storage unit 10). In embodiments, the modified aqueous based wellbore servicing fluid from which water has been removed in water removal apparatus 30 is returned into the wellbore 60, for example via pathway 75 from aqueous based fluid storage apparatus 10 or directly from water removal apparatus 30.

In embodiments, the aqueous based wellbore servicing fluid includes a drilling fluid and the drilling fluid is circulated downward through a drill string 61 extending from the surface of the earth 65 into the wellbore 60 in formation 64, out a drill bit 63 connected to an end 66 of the drill string 61, and upward through an annular space 62 formed between the drill string 61 and the wellbore 60.

In embodiments, after the removing of the water therefrom, the aqueous based wellbore servicing fluid (e.g., the modified aqueous based wellbore servicing fluid in modified aqueous based fluid outlet line(s) 36) has a target density. Aqueous based wellbore servicing fluids, such as drilling fluids, generally have target rheologies (e.g., densities) that are needed for providing a desired function. For example, without limitation, aqueous based drilling fluids may have a target density needed to lift drill cuttings away from a drill bit 63 during drilling operations. In embodiments, a method of this disclosure can further include adding a weighting material and/or water to the aqueous based wellbore servicing fluid, after the removing of the water therefrom, to attain the target density. For example, in the embodiment of FIG. 2, one or more water and or weighting agent inlet lines 55 can be fluidly attached to aqueous based fluid storage unit 10 and/or directly into water removal apparatus 30, whereby water and/or weighting agent(s) can be introduced thereto. Any weighting material known to those of skill in the art can be added to the aqueous based wellbore servicing fluid or the modified aqueous based wellbore servicing fluid to increase the density thereof to reach the desired target density. Such a weighting agent includes, without limitation, barite.

In embodiments, an amount of water removed in water removal apparatus 30 and an amount of weighting agent (e.g., barite) added to the aqueous based fluid (e.g., the modified aqueous based fluid from which water has been removed in water removal apparatus 30) added are accurately controlled. In embodiments, the method is utilized as a constant volume method, whereby an amount of water removed from water removal apparatus 30 via water outlet line(s) 35 and an amount of weighting agent (e.g., barite) added to the aqueous based fluid (e.g., the modified aqueous based fluid from which water has been removed in water removal apparatus 30) are controlled such that an amount of water to be removed is calculated and the process run until a constant volume of aqueous based fluid in aqueous based fluid storage unit 10 is achieved. After removing the water from the aqueous based wellbore servicing fluid in water removal apparatus 30, a predetermined amount of weighting agent (e.g., barite) can be added to the system (e.g., to water removal apparatus 30, modified aqueous based fluid outlet line 36, and/or aqueous based fluid storage unit 10) to complete the density increase to the target density.

Figure 3:
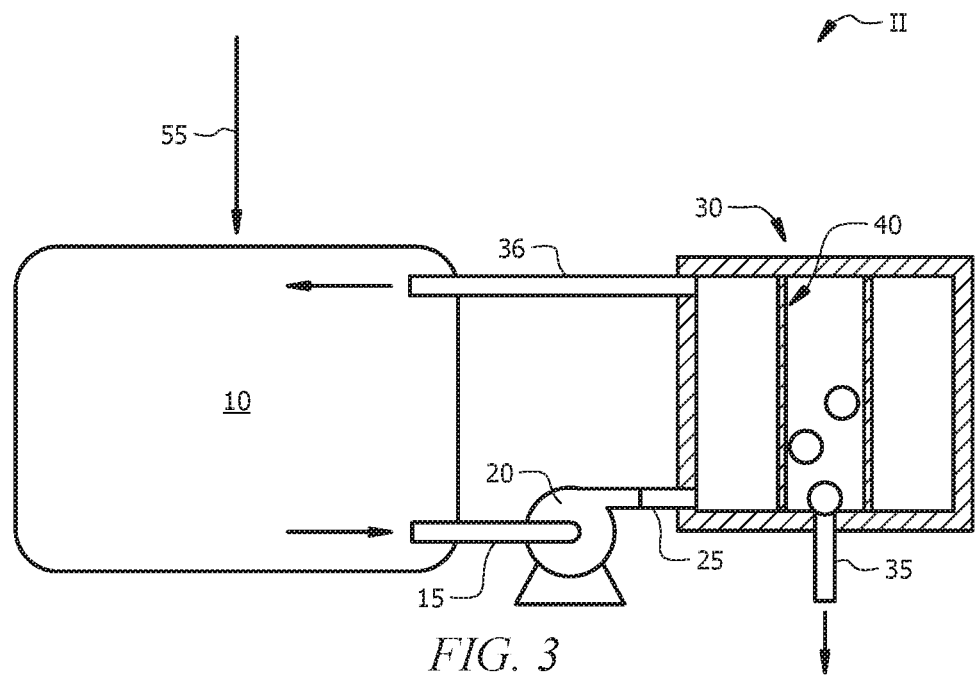
FIG. 3 is a schematic of another system II for recovering water from a water base fluid, according to embodiments of this disclosure.

FIG. 3 is a schematic of another system II for recovering water from a water base drilling fluid, according to embodiments of this disclosure. The embodiment of FIG. 3 is the same as that of FIG. 2, except a water or weighting material inlet line 55 is not utilized for introducing a weighting material (e.g., barite) into aqueous based fluid storage unit 10. Via the system II, a fluid volume in the system can decrease as water is removed from the aqueous based wellbore servicing fluid via water removal apparatus 30.

Figure 4:
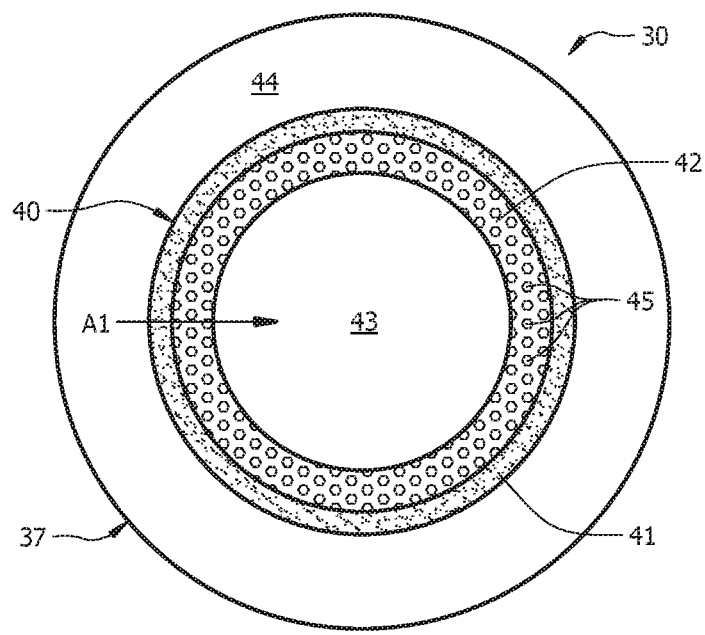
FIG. 4 is a schematic cross section view of a water removal apparatus according to embodiments of this disclosure.

Water removal apparatus 30 can have a variety of configurations, so long as water can removed therein via contacting of the aqueous based fluid introduced thereto with a coated substrate 40, as described herein, and water (e.g., that passes through the coated substrate(s) 40) and the water-reduced modified aqueous based fluid (e.g., the aqueous based fluid from which the water has been removed) can be removed therefrom. For example, in embodiments, system I of FIG. 2 or system II of FIG. 3 includes a water removal apparatus 30 as depicted in FIG. 4, which is a schematic of a water removal apparatus 30 according to embodiments of this disclosure. Water removal apparatus 30 of FIG. 4 includes a coated substrate 40 having a cylindrical or tube shaped porous substrate 42 coated with hydrophilic and oleophobic coating 41. In the embodiment of FIG. 4, porous cylindrical substrate 42 is coated on an outside thereof with the coating 41. In this embodiment, coated cylindrical substrate 40 defines an inside 43 or "removed water flow section" 43 inside cylindrical porous substrate 42, and an outside 44 or "aqueous based fluid flow section" 44 between coating 41 and wall (e.g., outer wall) 37. The outer wall 37 and the coated substrate 40 can, in such embodiments, include concentric tubes or cylinders defining outside 44 of coated substrate tube 40 and inside 43 of coated substrate tube 40. In this embodiment, hydrophilic and oleophobic coating 41 of coated substrate tube 40 attracts water from aqueous based fluid introduced into the aqueous based fluid flow section or outside 44 (e.g., via an inlet line connected therewith, which can, in embodiments, be a pump outlet line(s) 25), which water passes through cylindrical coated substrate 40 to the inside 43 of cylindrical coated substrate 40 which serves, in this arrangement, as a removed water flow section 43. Accordingly, in the embodiment of FIG. 4, water flows from outside 44 to inside 43 of cylindrical coated substrate 40 in the direction indicated by arrow A1. In such embodiments, an aqueous based fluid inlet line(s) (e.g., a pump outlet line(s) 25) can be fluidly connected with and introduce aqueous based fluid into outside 44 of coated substrate 40, while a removed water outlet line(s) 35 can be fluidly connected with and remove water from inside 44 of coated substrate 40.

In alternative embodiments, the hydrophilic and oleophobic coating 41 of a cylindrical coated substrate 40 is coated on the inside surface of porous substrate 42, in which embodiments, inside 43 of cylindrical coated substrate 40 can provide the aqueous based fluid flow section, and outside 44 of cylindrical coated substrate 40 can provide the removed water flow section. In such embodiments, water from the aqueous based fluid introduced into inside 43 (e.g., via an inlet line connected therewith, which can, in embodiments, be a pump outlet line(s) 25) can flow from inside 43 to outside 44, in a direction opposite to that indicated by arrow A1 in FIG. 4. In such embodiments, an aqueous based fluid inlet line (e.g., a pump outlet line(s) 25) can be fluidly connected with and introduce aqueous based fluid into inside 43 of coated substrate 40, while a removed water outlet line(s) can be fluidly connected with and remove water from outside 44 of coated substrate 40. In embodiments, a water removal apparatus 30 of this disclosure includes a plurality of cylindrical coated substrates 40, with associated water inlet lines (e.g., pump outlet lines 25), removed water outlet lines 35, and insides 43 and outsides 44 (which can provide aqueous based fluid flow sections and/or removed water flow sections).

Figure 5A:
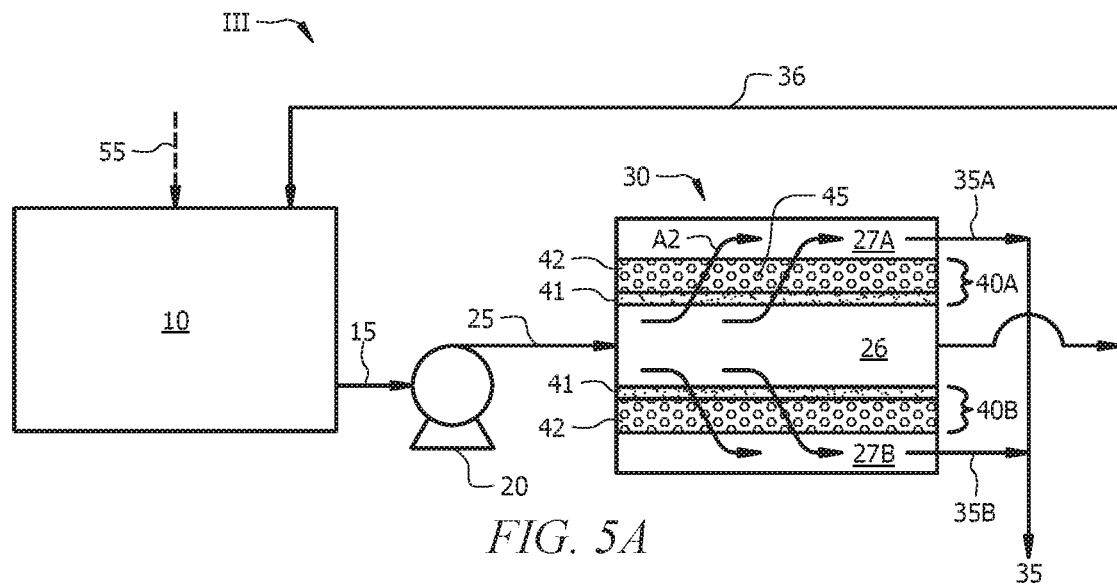
FIG. 5A is a schematic of another system III for recovering water from a water base fluid, according to embodiments of this disclosure.
Figure 5B:
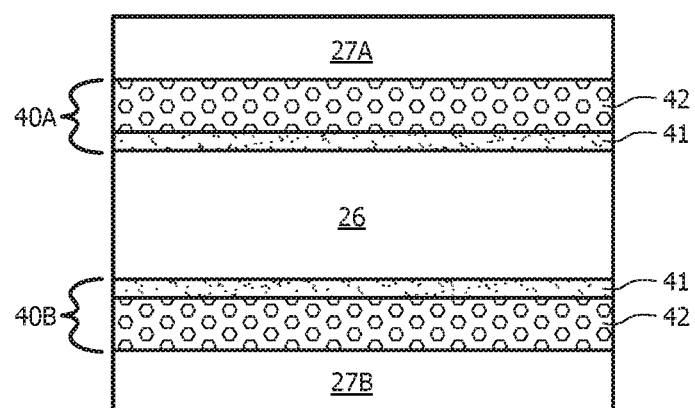
FIG. 5B is a front cross section view of the water removal apparatus of FIG. 5A.

FIG. 5A is a schematic of another system III for recovering water from a water base fluid, according to embodiments of this disclosure. Water removal apparatus 30 (shown in side view cross section in FIG. 5A) can have one or more layers or "beds" of coated substrate, with two layers of coated substrate 40, first coated substrate layer 40A and second coated substrate layer 40B, depicted in the embodiment of FIG. 5A. In such embodiments, aqueous based fluid can be introduced (e.g., from aqueous based fluid source 10, pump inlet line 15, pump 20, and pump outlet line 25) into one or more aqueous based fluid flow sections 26 of water removal apparatus 30 and water that passes from the aqueous based fluid, through the coated substrate layers 40A, 40B can be removed via one or more removed water flow sections 27. The aqueous based fluid flow sections 26 provide contact of the aqueous based fluid introduced into water removal apparatus 30 with the coating 41 of first coated substrate layer 40A and second coated substrate layer 40B. The removed water sections 27 provide a flow path for water that passes through first coated substrate layer 40A and second coated substrate layer 40B, on a side of substrate 42 opposite the coating 41. One aqueous based fluid flow section 26 and two removed water flow sections, including first water flow section 27A and second water flow section 27B, are depicted in the embodiment of FIG. 5A. FIG. 5B shows a front view cross section of the water removal apparatus 30 of FIG. 5A. A water removal apparatus 30 can include any number of coated substrates 40 (e.g., coated substrate layers, such as first coated substrate layer 40A and second coated substrate layer 40B of the embodiment of FIGS. 5A and 5B), aqueous based fluid flow sections 26, and removed water flow sections 27 (e.g., the single aqueous based fluid flow section 26 and two water flow sections including first water flow section 27A and second water flow section 27B shown in the embodiment of FIG. 5A and FIG. 5B).

Figure 6A:
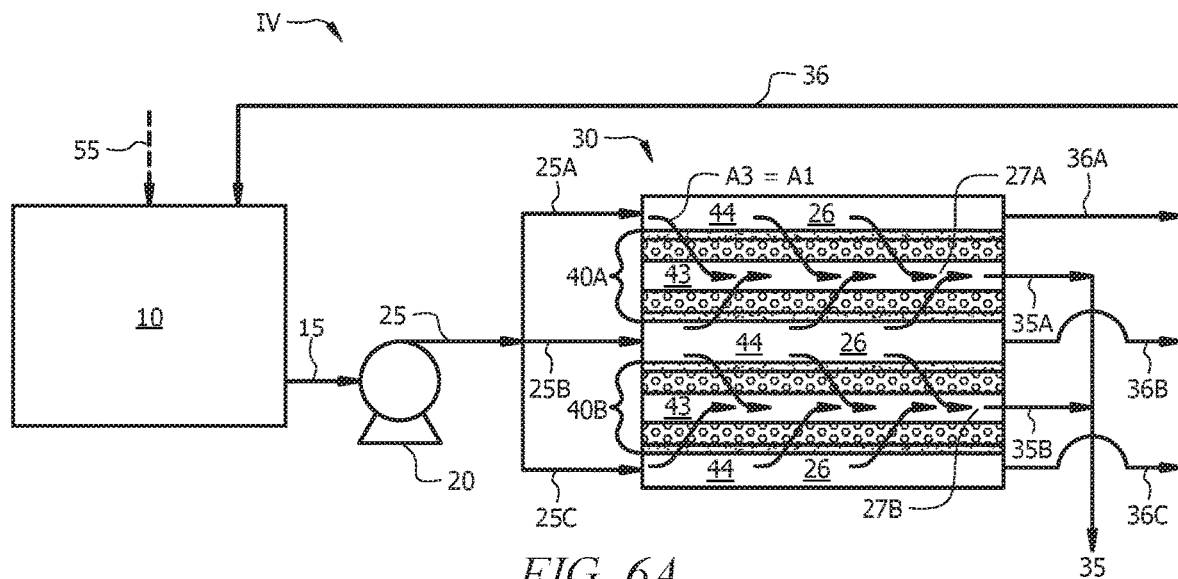
FIG. 6A is a schematic of another system IV for recovering water from a water base fluid, according to embodiments of this disclosure.
Figure 6B:
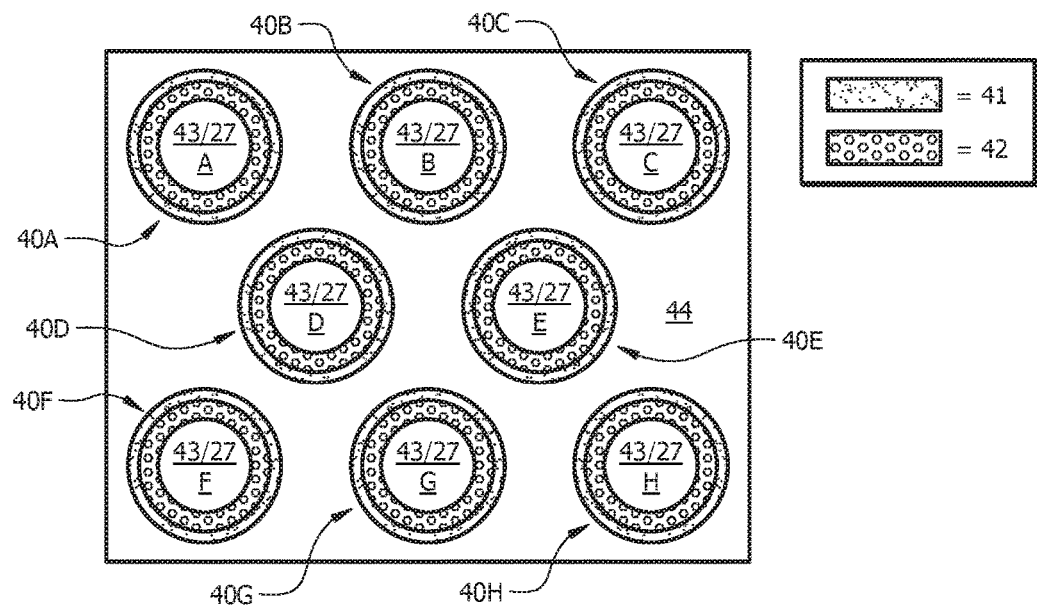
FIG. 6B is a front cross section view of water removal apparatus of FIG. 6A.

FIG. 6A is a schematic of another system IV for recovering water from a water base fluid, according to embodiments of this disclosure. FIG. 6B is a front cross section view of water removal apparatus 30 of the embodiment of FIG. 6A. Water removal apparatus 30 (shown in side view cross section in FIG. 6A) can include one or more cylindrical tubes (e.g., cylinders) of coated substrate (e.g., cylindrical coated membranes), with two, first cylindrical coated substrate 40A and second cylindrical coated substrate 40B) depicted in the embodiment of FIG. 6A and eight (first through eighth cylindrical coated substrates 40A-40H) depicted in the embodiment of FIG. 6B. In this embodiment, aqueous based fluid can be introduced from aqueous based fluid source 10, pump inlet line 15, pump 20, and pump outlet line 25 into one or more aqueous based fluid flow sections 26 of water removal apparatus 30 and water that passes from the aqueous based fluid, through the coating 41 of first cylindrical coated substrate 40A and water that passes from the aqueous based fluid through the coating 41 of the second cylindrical coated substrate 40B, and so on, can be removed via one or more removed water flow sections 27. Two removed water flow sections, first removed water flow section 27A and second removed water flow section 27B, are depicted in the embodiment of FIG. 6A. In this embodiment, outsides 44 of the coated substrates 40 (e.g., outsides 44 of first cylindrical coated substrate 40A and second cylindrical coated substrate 40B, and so on) provide the aqueous based fluid flow sections 26, while insides 43 of the coated substrates 40 (e.g., insides 43 of first cylindrical coated substrate 40A and second cylindrical coated substrate 40B) provide the removed water flow sections 27 (e.g., first removed water flow section 27A inside first cylindrical coated substrate 40A and second removed water flow section 27B inside second cylindrical coated substrate 40B, and so on). FIG. 6B shows a front cross section view of the water removal apparatus 30 of FIG. 6A including eight coated substrates 40A-40H with associated insides 43 providing water flow sections 27A-27H and outsides 44 providing water flow section 26. A water removal apparatus 30 can include any number of coated substrates 40. For example, a water removal apparatus can include one or a plurality of coated substrates 40. In embodiments, a water removal apparatus 30 of this disclosure includes from 1 to 50, from 1 to 20, from 10 to 50, from 2 to 100, or more coated substrates 40.

A water removal apparatus 30 can include any number of coated substrates 40 (e.g., cylindrical coated substrates or coated tubes, such as first cylindrical coated substrate 40A and second cylindrical coated substrate 40B, and so on, of the embodiment of FIGS. 6A and 6B), aqueous based fluid flow sections 26, and removed water flow sections 27. An aqueous based fluid inlet line, such as pump outlet line 25, can be utilized to introduce the aqueous based fluid into aqueous based fluid flow section(s) 26, a removed water outlet line 35 can be utilized to remove water from each of the removed water flow sections 27, and a modified aqueous based fluid outlet line 36 can be utilized to remove modified (e.g., water-reduced) aqueous based fluid from the aqueous based fluid flow section(s) 26 (e.g., at an end thereof). For example, in the embodiment of FIG. 5A and FIG. 5B, pump outlet line 25 can be utilized to introduce aqueous based fluid into aqueous based fluid flow section 26, modified aqueous based fluid outlet line 36 can be utilized to remove modified aqueous based fluid from aqueous based fluid flow section 26 (e.g., at an opposite end thereof from the aqueous based fluid inlet at pump outlet 25), and first removed water outlet line 35A and second removed water outlet line 35B can be utilized to remove water from first removed water flow section 26A and second removed water flow section 26B, respectively. First removed water outlet line 35A and second removed water outlet line 35B can be manifolded into removed water outlet line 35, in embodiments. In the embodiment of FIG. 6A and FIG. 6B, pump outlet line 25 and one or more aqueous based fluid inlet lines (e.g., first aqueous based fluid inlet line 25A, second aqueous based fluid inlet line 25B, and third aqueous based fluid inlet line 25C depicted in FIG. 6A) can be utilized to introduce aqueous based fluid into aqueous based fluid flow section(s) 26, first modified aqueous based fluid outlet line 36A, second modified aqueous based fluid outlet line 36B, and third aqueous based fluid outlet line 36C, and so on, can be utilized to remove modified aqueous based fluid from aqueous based fluid flow section(s) 26 (e.g., at an opposite end thereof from the aqueous based fluid inlet at aqueous based fluid inlets 25), and first removed water outlet line 35A and second removed water outlet line 35B, and so on, can be utilized to remove water from first removed water flow section 27A and second removed water flow section 27B, and so on, respectively. The one or more modified aqueous based fluid outlet lines 36 (e.g., first modified aqueous based fluid outlet line 36A, second modified aqueous based fluid outlet line 36B, third modified aqueous based fluid outlet line 36C, and so on) can be manifolded into modified aqueous based fluid outlet line 36, in embodiments. Similarly, the one or more removed water outlet lines 35 (e.g., first removed water outlet line 35A and second removed water outlet line 35B, and so on) can be manifolded into removed water outlet line 35, in embodiments.

One or more contaminated aqueous stream lines 25 can be utilized to introduce contaminated aqueous based fluid into each contaminated aqueous based fluid flow section 26. One or more modified aqueous based fluid outlet lines 36 can be utilized to remove modified aqueous based fluid from each contaminated aqueous based fluid flow section 26. One or more removed water outlet lines 35 can be utilized to removed treated water from each removed water flow section 27.

Although aqueous based fluid flow section 26 of the embodiment of FIG. 6A and FIG. 6B is shown as a continuous section in FIG. 6B (i.e., because coated substrates 40 are depicted as not touching), in embodiments, coated substrate tubes (e.g., first cylindrical coated substrate 40A, second cylindrical coated substrate 40B, etc.) can be in contact with neighboring coated substrate tubes, and a plurality of aqueous based fluid inlet flow lines, e.g., aqueous based inlet flow lines 25A, 25B, 25C, and so on) can be utilized to introduce the aqueous based fluid into disparate aqueous based fluid flow sections 26 of a water removal apparatus 30, in embodiments.

In the embodiment of FIG. 6A and FIG. 6B, water removal apparatus 30 is designed in a similar manner as a heat exchanger, wherein the coated substrate tubes 40 of the water removal apparatus 30 separate the flow of aqueous based fluid and the removed water that passes through the coating 41 (e.g., coated walls) and substrates 42 of the coated substrate tubes 40 the way the heat exchange tubes of a heat exchanger separate a heat exchanger fluid from a process fluid and heat passes through the walls of the heat exchanger tubes. The inside and the outside of the tubes act as the aqueous based fluid flow sections 26 and the removed water flow sections 27, respectively, or vice versa.

A plethora of configurations of the coated substrate 40 (e.g., layers or sheets, as depicted in the embodiments of FIGS. 5A and 5B, tubes or cylinders, as depicted in the embodiments of FIGS. 6A and 6B) are possible, and within the scope of this disclosure. For example, by way of further nonlimiting example, in alternative embodiments, the porous substrate 42 includes hollow particulates, and the particulate substrate is coated with the hydrophilic and oleophobic coating 41 to provide a coated substrate 40 including coated particulates. In such embodiments, water removal apparatus 30 can include a bed, layer, or containment of such coated particulates. In such embodiments, aqueous based fluid introduced into water removal apparatus 30, for example via an aqueous based fluid inlet line such as pump outlet line 25 contacts the particulates of coated substrate 40, water passes through the hydrophilic and oleophobic coating 41 of the coated particulates, and enters a hollow core, center, or region of the particulates. In such embodiments, the coated particulates having removed water sequestered therein can be regenerated (i.e., water removed therefrom), and be reused in water removal apparatus 30. Regeneration can include heating, pressing, or the like to remove the water from the spent coated substrate particulates prior to re-use.

In embodiments, a method of this disclosure further includes cycling the coated porous substrate 40/40A-40H through a backwash to clean an upstream surface thereof. Such cycling can be effected continuously, in embodiments.

Via the system and method of this disclosure, the aqueous based fluids (e.g., aqueous based drilling fluids in a mud plant) can be recycled several times through various density ranges. The density of the aqueous based wellbore servicing fluid in aqueous based wellbore servicing storage tank 10 can be alternately increased and decreased, as needed. The density of the aqueous based wellbore servicing fluid in aqueous based wellbore servicing fluid storage unit 10 can be increased by increasing an amount of water removed from the aqueous based wellbore servicing fluid in water removal apparatus 30 by increasing an amount of the aqueous based fluid introduced into water removal apparatus 30 via pump outlet line(s) 25, and/or an amount of modified aqueous based wellbore servicing fluid removed from water removal apparatus 30 (and returned to aqueous based fluid storage unit 10) via water reduced aqueous based fluid outlet line(s) 36), and/or by increasing an amount of weighting agent and/or decreasing an amount of water introduced into aqueous based wellbore servicing fluid storage unit 10 (and/or directly into water reduced aqueous based fluid outlet line(s) 36 and/or into water removal apparatus 30).

The density of the aqueous based wellbore servicing fluid in aqueous based wellbore servicing fluid storage unit 10 can be reduced by decreasing an amount of water removed from the aqueous based wellbore servicing fluid in water removal apparatus 30 by decreasing an amount of the aqueous based fluid introduced into water removal apparatus 30 via pump inlet line(s) 15, pump(s) 20, and pump outlet line 25(*s*), and/or an amount of modified aqueous based wellbore servicing fluid removed from water removal apparatus 30 (and returned to aqueous based fluid storage unit 20) via modified aqueous based fluid outlet line(s) 36), and/or reducing an amount of weighting agent and/or increasing an amount of water introduced into aqueous based fluid storage unit 10 (and/or directly into modified aqueous based fluid outlet line 36 and/or into water removal apparatus 30).

In embodiments, the aqueous based wellbore servicing fluid includes an aqueous based drilling fluid, and a method of servicing a wellbore 60 extending from a surface of the earth 65 and penetrating a subterranean formation 64, includes: removing water (e.g., via water outlet line(s) 35) from the aqueous based drilling fluid by contacting the aqueous based drilling fluid (e.g., in water removal apparatus 30 after introduction thereto via pump inlet line 15, pump 20, and/or pump outlet line 25) with a coated substrate 40 including a porous substrate 42 coated with a hydrophilic and oleophobic coating 41, whereby water is removed (e.g., via removed water outlet line(s) 35) from the aqueous based drilling fluid via passage through the coated substrate 40 having the porous substrate 42 coated with the hydrophilic and oleophobic coating 41, whereby a water concentration and a volume of the aqueous based drilling fluid are reduced and a density of the aqueous based wellbore servicing fluid is increased; and optionally adding a weighting material and/or water (e.g., via one or more water and/or weighting agent inlet lines 55) to the aqueous based drilling fluid after the removing of the water therefrom (e.g., added directly to water removal apparatus 30, water reduced, modified aqueous based wellbore servicing fluid outlet line(s) 36, and/or aqueous based wellbore servicing fluid storage unit 10, or a combination thereof).

In embodiments, the method further includes maintaining a substantially constant volume of the aqueous based drilling fluid in a mud pit (utilized as aqueous based fluid storage unit 10) containing same by controlling an amount of the water removed by the contacting of the aqueous based drilling fluid with the coated substrate 40 and an amount of the weighting material and/or the water optionally added to the aqueous based drilling fluid after the removing of the water therefrom.

As noted hereinabove, in embodiments aqueous based source 10 includes an aqueous based storage unit 10. For example, in embodiments, the aqueous based fluid is an aqueous based drilling fluid, and the aqueous based drilling fluid is stored, prior to and/or after the removing of the water therefrom, in a mud pit 10. In such embodiments, a weighting material can be added (e.g., via water and/or weighting agent inlet line(s) 55) to the mud pit 10 containing the aqueous based drilling fluid to increase the fluid density, as described hereinabove with reference to the embodiment of FIG. 2. Alternatively, the source of the aqueous based fluid includes the wellbore 60 (e.g., aqueous based fluid is introduced directly from wellbore 60 into water removal apparatus 30). As noted hereinabove, in embodiments, the aqueous based drilling fluid is recovered from the wellbore 60 prior to contact with the coated substrate 40 and the aqueous based wellbore drilling fluid is returned into the wellbore 60 after contact with the coated substrate 40.

In embodiments, a method of servicing a wellbore 60 extending from a surface of the earth 65 and penetrating a subterranean formation 64 according to this disclosure includes: circulating an aqueous based wellbore servicing fluid from the surface 65, into the wellbore 60, and back to the surface 65; and maintaining a desired density of the aqueous based wellbore servicing fluid by: removing water from the aqueous based wellbore servicing fluid by contacting the aqueous based wellbore servicing fluid with a coated substrate 40 having a porous substrate 42 coated with a hydrophilic and oleophobic coating 41, whereby water is removed from the aqueous based wellbore servicing fluid via passage through the coated substrate 40, and whereby a water concentration and a volume of the aqueous based wellbore servicing fluid are reduced and a density of the aqueous based wellbore servicing fluid is increased; and optionally adding a weighting material and/or water (e.g., to aqueous based fluid source or storage unit 10 via one or more water and/or weighting agent inlet line(s)) 55) to the aqueous based wellbore servicing fluid after the removing of the water therefrom (e.g., via removed water outlet line(s) 35). In some specific embodiments, as noted above, the hydrophilic and oleophobic coating 41 includes graphene oxide. In some such embodiments, the aqueous based wellbore servicing fluid is an aqueous based drilling fluid, and a water content of the aqueous based drilling fluid increases as it circulated from the surface 65, into the wellbore 60, and back to the surface 65.

In embodiments, a method of servicing a wellbore 60 extending from a surface of the earth 65 and penetrating a subterranean formation 64 according to this disclosure includes: recovering a spent fluid from the wellbore 60; forming a concentrated composition by removing a portion of the water from the spent fluid recovered from the wellbore 60, wherein the portion of the water is removed by contacting the spent fluid with a coated substrate 40 including a porous substrate 42 coated with a hydrophilic and oleophobic coating 41, as described herein, whereby water is removed (e.g., via water removal line(s) 35) from the spent fluid via passage through the coated substrate 40 to provide the concentrated composition. In embodiments, the concentrated composition has a water concentration and a volume that are less than a water concentration and a volume of the spent fluid, respectively, and a density that is greater than a density of the spent fluid. The method can further include disposing of the concentrated composition at a location proximate the wellbore 60 and/or transporting the concentrated composition to a location remote from the wellbore 60 and disposing thereof. In some such embodiments, the spent fluid includes a spent aqueous based wellbore servicing fluid. In embodiments, the spent aqueous based wellbore servicing fluid includes a spent aqueous based drilling fluid. In embodiments, the spent fluid includes produced water.

In embodiments, the volume of the concentrated composition is at least 5, 10, 20, 30, or 40 percent less than a volume of the spent aqueous based wellbore servicing fluid recovered from the wellbore 60. As described hereinabove, in embodiments, the water removed from the spent fluid via the passage through the porous substrate 42 (of coated substrate 40) is potable water.

The method can further include utilizing the water that is removed from the spent fluid via the passage through the coated substrate 40 (e.g., and removed from water removal apparatus 30 via removed water outlet line(s) 35) onsite or offsite as drinking water, wash water, irrigation water, cooling water, a component of an aqueous containing wellbore servicing fluid (e.g., an aqueous based or oil based wellbore servicing fluid), or a combination thereof. The water removal can be effected as detailed hereinabove. For example, in embodiments, the hydrophilic and oleophobic coating 41 utilized in this method includes graphene oxide.

Those of ordinary skill in the art will readily appreciate various benefits that may be realized by the present disclosure. For instance, in embodiments, the herein disclosed system and method enable real time adjustment of the water content of an aqueous based wellbore servicing fluid, whereby a density thereof can be adjusted to reach a target density. The herein disclosed system and method also enable the removal of water from an aqueous based wellbore servicing fluid whereby a volume of the aqueous based wellbore servicing fluid can be decreased and maintained at a desired constant volume and/or kept below a maximum desired amount (e.g., a maximum aqueous based fluid storage capacity or volume of an aqueous base fluid storage unit 10, such as. for example, a mud pit). In embodiments, via the herein disclosed system and method, potable water can be produced from aqueous based wellbore servicing fluids, and the potable water utilized onsite (e.g., for drinking water, wash water, irrigation water, cooling water, a component of a new aqueous containing wellbore servicing fluid (e.g., an aqueous based or oil based wellbore servicing fluid), or a combination thereof) and/or sent off site. In embodiments, the removal of water from aqueous based wellbore servicing fluids as per this disclosure can result in a reduced amount of hazardous or un-environmentally friendly materials (liquids and/or solids or semi-solids) for which permits and/or further treatment are required for disposal.

ADDITIONAL DISCLOSURE

The following are non-limiting, specific embodiments in accordance with the present disclosure:

Embodiment A

A method of servicing a wellbore extending from a surface of the earth and penetrating a subterranean formation, comprising: removing water from an aqueous based wellbore servicing fluid by contacting the aqueous based wellbore servicing fluid with a porous substrate coated with a hydrophilic and oleophobic coating, whereby water is removed from the aqueous based wellbore servicing fluid via passage through the porous substrate, and whereby a water concentration and a volume of the aqueous based wellbore servicing fluid are reduced and a density of the aqueous based wellbore servicing fluid is increased to provide a modified aqueous based wellbore servicing fluid.

Embodiment B

The method of Embodiment A, wherein the hydrophilic and oleophobic coating comprises graphene oxide.

Embodiment C

The method of Embodiment A or Embodiment B, wherein the aqueous based wellbore servicing fluid is a drilling fluid.

Embodiment D

The method of any of Embodiment A through Embodiment C, wherein the aqueous based wellbore servicing fluid is recovered from the wellbore prior to contact with the porous substrate and wherein the modified aqueous based wellbore servicing fluid is returned into the wellbore.

Embodiment E

The method of any of Embodiment A through Embodiment D, wherein the porous substrate comprises a membrane, a particulate, a tube, or a combination thereof.

Embodiment F

The method of any of Embodiment A through Embodiment E, wherein the porous substrate comprises a polymer, a ceramic, a zeolite, a molecular sieve, or a combination thereof.

Embodiment G

The method of any of Embodiment A through Embodiment F, wherein the contacting is effected at a differential pressure across the coated porous substrate of less than or equal to about 10, 9, 8, 7, 6, or 5 psi.

Embodiment H

The method of any of Embodiment A through Embodiment G, wherein the water removed via passage through the porous substrate coated with the hydrophilic and oleophobic coating is potable water.

Embodiment I

The method of Embodiment H, wherein the potable water comprises a total dissolved solids (TDS) content, as measured by conductivity and/or water evaporation, of less than or equal to about 5000, 4000, 3000, 2000, 1000, 750, or 500 ppm, a hydrocarbon content, as measured by 40 CFR Part 136 Method 608.3, 624.1, and/or 625.1, of less than or equal to about 500, 400, 300, 200, 100, 90, 80, 70, 60, 50, 40, 30, 20, or 10 mg/L, and/or a salt content, as measured by electrical conductivity, of less than or equal to about 5000, 4000, 3000, 2000, 1000, 900, 800, 700, 600, 500, 400, 300, 200, or 100 ppm.

Embodiment J

The method of any of Embodiment A through Embodiment I, wherein, after the removing of the water therefrom, the aqueous based wellbore servicing fluid has a target density.

Embodiment K

The method of any of Embodiment A through Embodiment J further comprising adding a weighting material and/or water to the aqueous based wellbore servicing fluid, after the removing of the water therefrom, to attain a target density.

Embodiment L

A method of servicing a wellbore extending from a surface of the earth and penetrating a subterranean formation, the method comprising: removing water from the aqueous based drilling fluid by contacting the aqueous based drilling fluid with a porous substrate coated with a hydrophilic and oleophobic coating, whereby water is removed from the aqueous based drilling fluid via passage through the porous substrate, and whereby a water concentration and a volume of the aqueous based drilling fluid are reduced and a density of the aqueous based wellbore servicing fluid is increased; and optionally adding a weighting material and/or water to the aqueous based drilling fluid after the removing of the water therefrom.

Embodiment M

The method of Embodiment L further comprising maintaining a substantially constant volume of the aqueous based drilling fluid in a mud pit containing same by controlling an amount of the water removed by the contacting of the aqueous based drilling fluid with the porous substrate and an amount of the weighting material and/or the water optionally added to the aqueous based drilling fluid after the removing of the water therefrom.

Embodiment N

The method of Embodiment M, wherein the aqueous based drilling fluid is stored, prior to and/or after the removing of the water therefrom, in a mud pit, and/or wherein the weighting material is added to a mud pit containing the aqueous based drilling fluid.

Embodiment O

The method of any of Embodiment L through Embodiment N, wherein the aqueous based drilling fluid is recovered from the wellbore prior to contact with the porous substrate and wherein the aqueous based wellbore drilling fluid is returned into the wellbore after contact with the porous substrate.

Embodiment P

The method of Embodiment O, wherein the drilling fluid is circulated downward through a drill string extending from the surface into the wellbore, out a bottom hole assembly (BHA) connected to an end of the drill string, and upward through an annular space formed between the drill string and the wellbore.

Embodiment Q

A method of servicing a wellbore extending from a surface of the earth and penetrating a subterranean formation, the method comprising: circulating an aqueous based wellbore servicing fluid from the surface, into the wellbore, and back to the surface; and maintaining a desired density of the aqueous based wellbore servicing fluid by: removing water from the aqueous based wellbore servicing fluid by contacting the aqueous based wellbore servicing fluid with a porous substrate coated with a hydrophilic and oleophobic coating, whereby water is removed from the aqueous based wellbore servicing fluid via passage through the porous substrate, and whereby a water concentration and a volume of the aqueous based wellbore servicing fluid are reduced and a density of the aqueous based wellbore servicing fluid is increased; and optionally adding a weighting material and/or water to the aqueous based wellbore servicing fluid after the removing of the water therefrom.

Embodiment R

The method of Embodiment Q, wherein the hydrophilic and oleophobic coating comprises graphene oxide.

Embodiment S

The method of Embodiment Q or Embodiment R, wherein the aqueous based wellbore servicing fluid is an aqueous based drilling fluid, and wherein a water content of the aqueous based drilling fluid increases as it circulated from the surface, into the wellbore, and back to the surface.

Embodiment T

A method of servicing a wellbore extending from a surface of the earth and penetrating a subterranean formation, comprising: recovering a spent fluid from the wellbore; forming a concentrated composition by removing a portion of the water from the spent fluid recovered from the wellbore, wherein the portion of the water is removed by contacting the spent fluid with a porous substrate coated with a hydrophilic and oleophobic coating, whereby water is removed from the spent fluid via passage through the porous substrate to provide the concentrated composition, wherein the concentrated composition has a water concentration and a volume that are less than a water concentration and a volume of the spent fluid, respectively, and a density that is greater than a density of the spent fluid; and disposing of the concentrated composition at a location proximate the wellbore, transporting the concentrated composition to a location remote from the wellbore and disposing thereof, or disposing of a first portion of the concentrated composition at a location proximate the wellbore and transporting a second portion of the concentrated composition to a location remote from the wellbore and disposing thereof.

Embodiment U

The method of Embodiment T, wherein the volume of the concentrated composition is at least 5, 10, 20, 30, or 40 percent less than a volume of the spent aqueous based wellbore servicing fluid recovered from the wellbore.

Embodiment V

The method of Embodiment T or Embodiment U, wherein the spent fluid comprises a spent aqueous based wellbore servicing fluid.

Embodiment W

The method of any of Embodiment T through Embodiment V, wherein the spent aqueous containing wellbore servicing fluid comprises a spent aqueous based drilling fluid.

Embodiment X

The method of any of Embodiment T through Embodiment W, wherein the spent fluid comprises produced water.

Embodiment Y

The method of any of Embodiment T through Embodiment X, wherein the water removed from the spent fluid via the passage through the porous substrate is potable water.

Embodiment Z1

The method of any of Embodiment T through Embodiment Y further comprising utilizing the water that is removed from the spent fluid via the passage through the porous substrate onsite or offsite as drinking water, a component of an aqueous based wellbore servicing fluid, or a combination thereof.

Embodiment Z2

The method of any of Embodiment T through Embodiment Z1, wherein the hydrophilic and oleophobic coating comprises graphene oxide.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method of servicing a wellbore extending from a surface of the earth and penetrating a subterranean formation, comprising:
   recovering an aqueous-based drilling fluid from the wellbore;
   removing water from the aqueous-based drilling fluid by contacting the aqueous-based drilling fluid with a porous substrate coated with a hydrophilic and oleophobic coating, whereby the water is removed from the aqueous-based drilling fluid via passage through the porous substrate, and whereby a water concentration and a volume of the aqueous-based drilling fluid are reduced and a density of the aqueous-based drilling fluid is increased; and
   adding a weighting material to the aqueous-based drilling fluid after the removing of the water therefrom, and
   further comprising a mud pit containing the aqueous-based drilling fluid, and maintaining a target volume of the aqueous-based drilling fluid in the mud pit by controlling an amount of the water removed by the contacting of the aqueous-based drilling fluid with the porous substrate and an amount of the weighting material added to the aqueous-based drilling fluid after the removing of the water therefrom.

2. The method of claim 1, wherein the hydrophilic and oleophobic coating comprises graphene oxide.

3. The method of claim 1:
   wherein the porous substrate comprises a membrane, a particulate, a tube, a polymer, a ceramic, a zeolite, a molecular sieve, or a combination thereof.

4. The method of claim 1, wherein the contacting is effected at a differential pressure across the coated porous substrate of less than or equal to 10 psi.

5. The method of claim 1, wherein the water removed via passage through the porous substrate coated with the hydrophilic and oleophobic coating is potable water.

6. The method of claim 5, wherein the potable water comprises a total dissolved solids (TDS) content, as measured by conductivity or water evaporation, of less than or equal to 5000 ppm, a hydrocarbon content of less than or equal to 500 mg/L, or a salt content, as measured by electrical conductivity, of less than or equal to 5000 ppm.

7. The method of claim 1:
   wherein, after the removing of the water therefrom, the aqueous-based drilling fluid has a target density; or
   further comprising adding the weighting material or water to the aqueous-based drilling fluid after the removing of the water therefrom, to attain a target density.

8. The method of claim 1, wherein the aqueous-based drilling fluid is stored, prior to or after the removing of the water therefrom, in the mud pit, or wherein the weighting material is added to the mud pit containing the aqueous-based drilling fluid.

9. The method of claim 1, wherein the aqueous-based wellbore drilling fluid is returned into the wellbore after contact with the porous substrate.

10. The method of claim 9, wherein upon return of the drilling fluid to the wellbore, the drilling fluid is circulated downward through a drill string extending from the surface into the wellbore, out an end of the drill string, and upward through an annular space formed between the drill string and the wellbore.

* * * * *